US006475643B1

(12) United States Patent
Hasegawa et al.

(10) Patent No.: US 6,475,643 B1
(45) Date of Patent: Nov. 5, 2002

(54) PLATED ELECTRICAL LEADS

(75) Inventors: Tomohide Hasegawa, Kakogawa (JP); Ichiro Nawata, Kobe (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 09/699,487

(22) Filed: Oct. 31, 2000

(30) Foreign Application Priority Data

Nov. 1, 1999  (JP) ............................................ 11-311040

(51) Int. Cl.⁷ ........................... B32B 15/01; C23C 2/08; C23C 13/00
(52) U.S. Cl. ...................... 428/647; 428/648; 428/929; 428/939; 427/433
(58) Field of Search ............................... 428/646, 647, 428/648, 643, 644, 929, 939; 427/433, 405

(56) References Cited

U.S. PATENT DOCUMENTS 5,635,755 A  *  6/1997  Kinghorn .................... 257/666
5,985,212 A  * 11/1999  Hwang et al. ............... 420/560
6,296,722 B1 * 10/2001  Nishimura .................. 148/400

FOREIGN PATENT DOCUMENTS

| JP | 55-72048 | * | 5/1980 |
| JP | 07-040079 | * | 2/1995 |
| JP | 11-221695 | * | 8/1999 |

* cited by examiner

Primary Examiner—John J. Zimmerman
(74) Attorney, Agent, or Firm—Michael Tobias

(57) ABSTRACT

A plated lead for electrical devices is plated with a Sn-based lead-free alloy containing 0.001–0.1 weight percent of Ga. The formation of oxides in a hot dipping bath can be suppressed by the presence of 0.001–0.1 weight percent of P in the alloy.

23 Claims, No Drawings

PLATED ELECTRICAL LEADS

BACKGROUND OF THE INVENTION

1. Field of the Invention

This invention relates to plated electrical leads for use in electrical devices, and in particular to electrical leads plated with a lead-free Sn alloy.

2. Description of the Related Art

The metals most commonly used to manufacture electrical leads for electrical devices, such as electronic devices, are copper and Fe-containing alloys such as Kovar (Fe-29Ni-17Co) and Alloy 42 (Fe-42Ni). Copper has good solderability when its surface is clean, but as time passes, its surface oxidizes and its solderability worsens. Fe-containing alloys for use in electrical leads such as Kovar and Alloy 42 are inexpensive and have excellent mechanical properties, but they have poor solderability.

For these reasons, copper leads are typically plated with a metal which can prevent surface oxidation, while electrical leads made of Fe-containing alloys such as Kovar and Alloy 42 are typically plated with a metal having excellent solderability and good resistance to oxidation. Examples of plating materials having these properties include gold, silver, tin, and solder.

While gold and silver have excellent solderability and oxidation resistance, they are extremely expensive, so they are impractical for use as a plating material for inexpensive electrical equipment such as ordinary home electrical appliances, and for reasons of economy are limited to use in more expensive electronic equipment such as computers or communications equipment. For inexpensive, mass produced electrical equipment, Sn or solder, which is inexpensive, is typically used as a plating material.

When electrical leads plated with elemental Sn are exposed to high humidity, so-called whiskers (whisker-shaped crystals) may grow on the plating and may cause short circuits if they contact adjoining leads or other conducting members. The addition of Pb, Bi, Ag, Cu, or Sb to Sn is effective in suppressing the formation of whiskers, so it is common to plate electrical leads with a Sn alloy containing one or more of these alloying elements. Of these elements for suppressing the formation of whiskers, Pb is particularly inexpensive, so a Sn—Pb solder alloy has been widely used as a plating material for electrical leads.

Recently, however, there has been a movement away from the use of Sn—Pb solder alloys as a plating material because of potential environmental problems associated with Pb. When electrical equipment is discarded, it is usually disposed of by burial in landfills, since the equipment may contain many components which are unsuitable for incineration. If Sn—Pb solder alloy plating in equipment buried in landfills comes into contact with acid rain, the acid rain can eluate Pb from the plating. Rain water containing the Pb can then permeate into the ground and mix with underground water to contaminate it. If underground water containing Pb enters the water supply and is drunk for long periods of time, Pb accumulates within the human body and may cause lead (Pb) poisoning. As a result, the use of Sn—Pb solder alloys as plating materials has come to be regulated. In response, lead-free (Pb-free) plating materials in which an oxidation suppressing metal other than Pb is added to Sn have come to be used.

A lead-free plating material can be applied to an electrical lead by electroplating or chemical plating, but with these plating methods, the thickness of plating which can be adhered to electrical leads is at most on the order of 0.2–1 micrometer. With such a thin plating, if plated electrical leads rub against each other or against another member, the plating can easily wear off, possibly resulting in rusting and solder defects where the plating has worn off. Therefore, electrical leads are frequently plated by hot dipping, since this method can form a thicker plating layer than can other plating methods.

However, when electrical leads are plated with a Sn alloy by hot dipping, although there is little surface oxidation immediately after plating, oxidation cannot be entirely prevented, and after a long period of time, the surface of the plating ends up oxidizing, and the solderability of the plating deteriorates.

Oxidation of the surface of plating formed by electroplating or electroless plating is also inevitable.

The reliability of a semiconductor device, such as an IC package, is affected by the reliability of soldered joints connecting electrical leads of the device to other equipment, and the reliability of soldered joints is reduced by the presence of surface oxidation on the leads. Therefore, in order to maximize the reliability of a semiconductor device, it is desirable to prevent even a slight level of surface oxidation on electrical leads of the device.

SUMMARY OF THE INVENTION

The present invention provides a lead-free plating material suitable for plating of electrical leads which does not readily undergo surface oxidation even if a long period elapses after plating.

The present invention also provides a plated electrical lead plated with such a lead-free plating material.

The present invention further provides a method of plating electrical leads for electrical devices.

The present inventors discovered that the inclusion of Ga in a Sn-based alloy results in a lead-free plating material suitable for plating of electrical leads and having good resistance to surface oxidation after plating as well as excellent solderability. It was also found that the resistance to surface oxidation of the plating material can be further improved by the additional inclusion of P in the Sn-based alloy.

According to one aspect of the present invention, a plated electrical lead is plated with a lead-free Sn-based alloy containing 0.001–0.1 weight percent of Ga. As used herein, a Sn-based alloy refers to an alloy in which Sn is the largest single component of the alloy in terms of weight percent. The Sn-based alloy may be a binary alloy of Sn and Ga, or it may be a ternary or higher alloy, including, in addition to Sn and Ga, a variety of alloying elements such as P, Bi, Ag, Cu, Sb, Zn, In, and Ni.

According to another aspect of the present invention a method of forming a plated electrical lead includes plating with a lead-free Sn-based alloy containing 0.001–0.1 weight percent of Ga.

Plated electrical leads according to the present invention can be used for a wide variety of applications in electrical devices and can have a wide variety of forms. For example, the leads can be in the form of lead wires or strips for connecting terminals or electrodes of circuit boards or IC packages to other devices, and they can be in the form of lead frames for IC packages.

DESCRIPTION OF PREFERRED EMBODIMENTS

According to one form of the present invention, a plating material is a lead-free Sn-based alloy containing 0.001–0.1 weight percent of Ga. If the amount of Ga in the alloy is less than 0.001 weight percent, Ga is not able to improve the resistance to surface oxidation of the plating. On the other hand, the effectiveness of Ga saturates at 0.1 weight percent, and further improvement in oxidation resistance cannot be expected above this amount. A preferred range for Ga is 0.010–0.050 weight percent.

In a preferred embodiment, the plating material consists essentially of 0.001–0.1 weight percent of Ga and a balance of Sn.

A plating material according to the present invention may also include 0.001 to 0.1 weight percent of P. The addition of P in this range can further improve the resistance of the plating to surface oxidation, and it can suppress the formation of oxides on the surface of a hot dipping bath. If the amount of P which is employed is less than 0.001 weight percent, it is not able to adequately suppress surface oxidation, while the presence of more than 0.1 weight percent worsens the adhesion of the plating material to the material being plated.

In a preferred embodiment, the plating material consists essentially of 0.001–0.1 weight percent of Ga, 0.001–0.1 weight percent of P and a balance of Sn.

The plating material may contain at least one of Bi, Ag, Cu, Sb, Zn, In and N. The amount of each of these elements may be determined by the purpose of the addition thereof.

For example, up to 2.5 weight percent of Cu may be added in order to prevent copper dissolution.

A lead-free Sn-based alloy employed in a plating material according to the present invention can be formed by standard techniques for the manufacture of alloys.

A plating material according to the present invention will typically be plated on an electrical lead by hot dipping, but other plating techniques such as electrical plating and chemical plating may also be employed. Hot dipping is preferred and may be performed using standard techniques. The thickness of plating formed by hot dipping is preferably at least 30 micrometers.

According to the present invention, when hot dipping is employed, generation of oxides atop a plating bath can successfully be suppressed by the presence of P in the Sn-based alloy.

There are no particular restrictions on the shape or the material properties of electrical leads to be plated by a plating material according to the present invention. For example, an electrical lead to be plated may be in the form of metal wire or strip having a round, flat, or other desired cross-sectional shape.

Examples of materials of which the electrical lead can be made include but are not limited to copper and Fe-containing alloys such as Kovar and Alloy 42.

An electrical lead may be plated when in the form of a continuous wire or strip prior to being cut, shaped, or otherwise processed to the final size and shape in which it is to be used in an electrical device, or it may be plated after having been processed into its final size and shape. For example, an electrical lead may be plated while in the form of a continuous wire or strip which is wound into a coil after being plated to be shipped to device manufacturers, who can then cut or blank the electrical lead to appropriate lengths and shapes for use in electrical devices. An example of a situation in which an electrical lead has been formed into its final size and shape for use in an electrical device prior to being plated is when the electrical lead is one of plurality of leads of a lead frame for a semiconductor device, and the leads of the lead frame are subjected to hot dipping. However, a lead frame may also be produced by blanking a strip which has previously been plated.

Methods for hot dipping of continuous wire and strips and methods for hot dipping of shaped members such as leads of lead frames are well known in the art, and any method suitable to the type of lead being plated can be employed in the present invention.

An electrical lead which has been plated with a plating material according to the present invention will frequently be connected to other members by soldering.

Any suitable methods known in the art for soldering of plated electrical leads can be employed for plated electrical leads according to the present invention.

EXAMPLES

A number of examples of plated electrical leads according to the present invention and comparative examples of plated electrical leads were prepared in the following manner. Each electrical lead, which was formed from a Cu wire with a diameter of 0.3 mm, was plated by hot dipping in a plating bath having one of the compositions shown in the table to form a plating with a thickness of 10 micrometers on the wire. After plating, each electrical lead was left for ten hours in a constant temperature chamber at 140° C., at the end of which time the surface of the plating was visually observed for discoloration. When Sn or a Sn alloy oxidizes, its surface takes on a yellowish tinge, so the extent of discoloration is an indication of the extent of surface oxidation.

The results are shown in the table. A rating of excellent indicates no surface discoloration, a rating of good indicates slight surface discoloration, a rating of fair indicates somewhat large surface discoloration, and a rating of failure indicates extreme surface discoloration.

The various plating materials were also evaluated for the ability to suppress the formation of oxides on the surface of a hot dipping bath. Each plating material shown in the table was maintained at 250° C. in a hot dipping tank, and the amount of oxides which formed after five hours was visually observed. A rating of excellent indicates almost no formation of oxides, a rating of good indicates the formation of only a small amount of oxides, a rating of fair indicates the formation of a somewhat large amount of oxides, and a rating of failure indicates the formation of a large amount of oxides.

| | Plating Material (weight %) | | | | | | | Test of Properties | |
|---|---|---|---|---|---|---|---|---|---|
| | Sn | Ga | Cu | Bi | Ag | Zn | P | Surface Discoloration | Oxide Formation |
| Example 1 | Remainder | 0.015 | — | — | — | — | — | Good | Good |
| Example 2 | Remainder | 0.015 | 0.5 | — | — | — | — | Good | Good |
| Example 3 | Remainder | 0.015 | — | 2.0 | — | — | — | Excellent | Good |
| Example 4 | Remainder | 0.015 | — | — | 3.5 | — | — | Excellent | Good |
| Example 5 | Remainder | 0.015 | — | — | — | 9.0 | — | Good | Fair |
| Example 6 | Remainder | 0.015 | 0.5 | 2.0 | 2.0 | — | — | Excellent | Good |
| Example 7 | Remainder | 0.05 | — | — | — | — | — | Excellent | Good |
| Example 8 | Remainder | 0.01 | — | — | — | — | 0.01 | Excellent | Excellent |
| Example 9 | Remainder | 0.01 | 0.5 | — | — | — | 0.01 | Excellent | Excellent |
| Example 10 | Remainder | 0.01 | — | — | 3.5 | — | 0.01 | Excellent | Excellent |
| Example 11 | Remainder | 0.02 | — | — | — | 9.0 | 0.05 | Good | Fair |
| Comparative Example 1 | Remainder | — | 0.5 | — | — | — | — | Failure | Failure |
| Comparative Example 2 | Remainder | — | — | — | — | — | 0.01 | Failure | Good |
| Comparative Example 3 | Remainder | — | — | — | — | 9.0 | — | Failure | Failure |
| Comparative Example 4 | 100 | — | — | — | — | — | — | Failure | Fair |

From this table, it can be seen that a plating material according to the present invention undergoes an extremely small amount of surface oxidation even if left for long periods after plating, so soldering defects due to surface oxidation can be eliminated. Furthermore, the formation of large amount of oxides on the surface of a hot dipping bath can be prevented. As a result, the uniformity of plating of electrical leads can be increased.

What is claimed is:

1. A plated electrical lead plated with a lead-free Sn-based alloy containing 0.001–0.1 weight percent of Ga.

2. A plated electrical lead as claimed in claim 1 wherein the lead-free alloy contains 0.001–0.1 weight percent of P.

3. A plated electrical lead as claimed in claim 1 wherein the lead-free alloy is a binary alloy of Sn and Ga.

4. A plated electrical lead as claimed in claim 1 wherein the lead-free alloy includes at least one of Bi, Ag, Cu, Sb, Zn, In, and Ni.

5. A plated electrical lead as claimed in claim 1 wherein the lead-free alloy is plated to a thickness of at least 30 micrometers.

6. A plated electrical lead as claimed in claim 1 wherein the lead-free alloy consists essentially of 0.001–0.1 weight percent of Ga, 0–0.1 weight percent of P, and a balance of Sn.

7. A plated electrical lead as claimed in claim 6 wherein the lead-free alloy contains 0.001–0.1 weight percent of P.

8. A plated electrical lead as claimed in claim 6 wherein the lead-free alloy contains 0.010–0.050 weight percent of Ga.

9. A plated electrical lead as claimed in claim 6 wherein the lead has been plated by hot dipping.

10. A method of forming a plated electrical lead comprising plating an electrical lead with a lead-free Sn-based alloy containing 0.001–0.1 weight percent of Ga.

11. A method as claimed in claim 10 wherein the lead-free alloy contains 0.001–0.1 weight percent of P.

12. A method as claimed in claim 10 wherein the lead-free alloy is a binary alloy of Sn and Ga.

13. A method as claimed in claim 10 wherein the lead-free alloy includes at least one of Bi, Ag, Cu, Sb, Zn, In, and Ni.

14. A method as claimed in claim 10 including plating the electrical lead by hot dipping.

15. A method as claimed in claim 10 including plating the electrical lead to a thickness of at least 30 micrometers.

16. A plating method comprising dipping an electrically conducting member in a bath of a lead-free Sn-based alloy containing 0.001–0.1 weight percent of Ga.

17. A plating method as claimed in claim 16 wherein the electrically conducting member comprises a lead of a lead frame.

18. A plating method as claimed in claim 16 wherein the bath contains 0.001–0.1 weight percent of P.

19. A plating method as claimed in claim 16 wherein the bath consists essentially of 0.001–0.1 weight percent of Ga, 0.001–0.1 weight percent of P, and a balance of Sn.

20. A plating method as claimed in claim 16 wherein the lead-free alloy forms an outer plating layer on the electrically conducting member.

21. A plated electrical lead as claimed in claim 1 wherein the lead-free alloy forms an outer plating layer on the electrical lead.

22. A method as claimed in claim 10 wherein the lead-free alloy consists essentially of 0.001–0.1 weight percent of Ga, 0.001–0.1 weight percent of P, and a balance of Sn.

23. A method as claimed in claim 10 wherein the lead-free alloy forms an outer plating layer on the electrical lead.

* * * * *